United States Patent Office 3,120,072
Patented Feb. 4, 1964

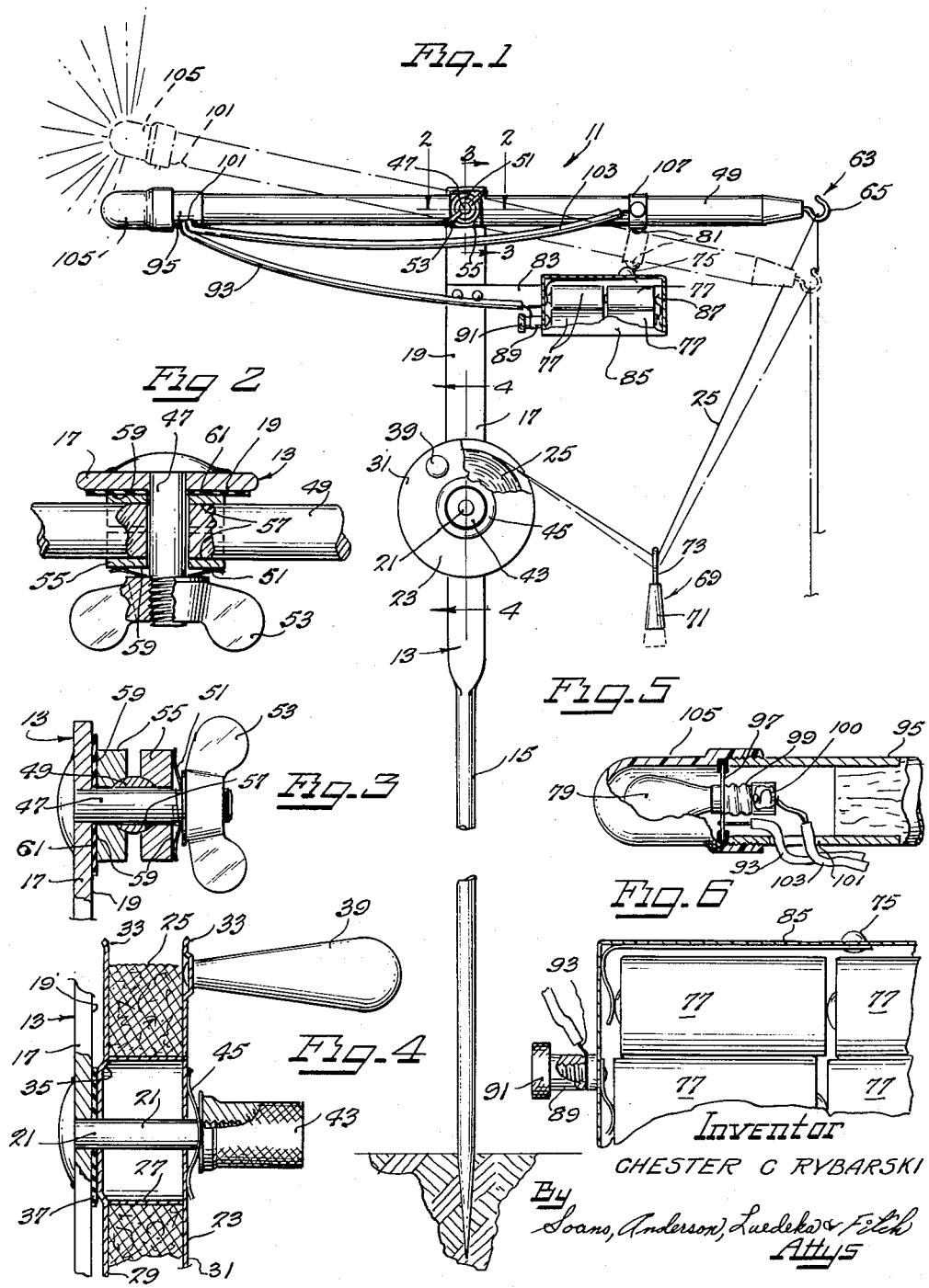

3,120,072
FISHING DEVICE
Chester C. Rybarski, 113 155th Place, Calumet City, Ill.
Filed July 18, 1962, Ser. No. 210,637
1 Claim. (Cl. 43—17)

This invention relates to still fishing devices which are capable of supporting the line and, in addition, of signalling the fisherman when a fish has been hooked.

In the practice of still fishing, it is of course necessary to maintain the fishing line relatively motionless in the water while waiting for a fish to grab the bait. Various devices have therefore been provided for independently supporting the line so that the fisherman may be free for other tasks, or may otherwise occupy himself during the periods of inactivity. Such devices are particularly helpful in ice fishing where the necessarily low temperature makes it uncomfortable for the fisherman to support the line in a motionless position for an extended period of time, and where it is necessary for him to frequently adjourn to a shelter to warm himself.

It is desirable that such still fishing devices include some form of signal system to appraise the fisherman of the fact that a fish has been hooked. Signal systems have been provided which cause a bell to ring when a fish tugs on the line, but these systems are not completely satisfactory since the noise of the bell disturbs nearby fishermen and may frighten away other fish in the vicinity. Also, the bell is not completely effective at night when the fisherman may have many lines in the water simultaneously and may therefore have no way of determining immediately by which device the signal was produced.

The principal object of the present object of the present invention is to provide an improved fishing device having a effective signaling system.

Another object of the invention is to provide an improved fishing device which can be selectively regulated so as to provide varying degrees of sensitivity.

A further object of the invention is to provide a fishing device having a signal system by means of which several similar devices can be distinguished from one another.

Other objects and advantages of the invention will become apparent with reference to the following description and the accompanying drawings.

In the drawings:

FIGURE 1 is an elevational view, partially in section, of a fishing device showing various of the features of the invention;

FIGURE 2 is an enlarged fragmentary partially broken-away sectional view taken along line 2—2 of FIGURE 1;

FIGURE 3 is an enlarged fragmentary sectional view taken along line 3—3 of FIGURE 1;

FIGURE 4 is an enlarged fragmentary partially broken-away sectional view taken along line 4—4 of FIGURE 1;

FIGURE 5 is an enlarged fragmentary view, partially in section, of a portion of the signal system of the device; and FIGURE 6 is an enlarged fragmentary view, partially in section, of another portion of the signal system of the device.

A device 11 constituting one embodiment of the invention is shown in the drawing and comprises an elongated relatively narrow standard 13 formed so as to include a lower portion 15 of generally circular cross section and an upper portion 17 having a flat broadened forward face 19 adjacent which certain of the components of the device are mounted. The lower portion 15 is tapered to a point adjacent its lower end so that it may be driven vertically into the ice or ground so as to thereby maintain the standard in a generally upright position. It would of course be possible, however, to attach a weighted base to the lower end of the standard should it be desirable to support it on a boat or pier.

Projecting from the forward face of the device and spaced downwardly from the upper end thereof is a mounting stud 21 on which a spool or reel 23 is rotatably carried. The reel 23 is adapted to accommodate a supply of fishing line 25 and includes a generally cylindrical hollow hub 27, to the opposite ends of which are secured a pair of retaining plates 29 and 31 disposed in generally parallel relation to each other. The peripheral edge of each of the plates is offset outwardly slightly, as at 33, to guide the line 25 into wrapping engagement with the hub, and the center portion of the innermost plate 29 is embossed outwardly, as at 35, to provide a lateral bearing surface which engages a washer 37 interposed between the reel and standard. A handle 39 projects outwardly from the outer plate 31 to facilitate rewinding of the line.

It is desirable that there be sufficient resistance to the rotation of the reel so that a large amount of line will not be played out in a short period of time after a fish has struck but before the fisherman is appraised of the situation. However, the resistance to rotation of the reel is preferably such that the line will be played out gradually so that the tension thereon will not exceed the physical limits thereof. Accordingly, a system is provided for introducing a frictional drag on the reel as it rotates and comprises a spring washer 45 disposed adjacent the reel and a cap nut 43 which urges the washer into contact with the reel. The spring washer 45 bears against the reel and creates a frictional drag during rotation thereof in both directions. The amount of drag can, of course, be regulated by tightening or loosening the cap nut.

Projecting outwardly from the face 19 of the standard 13 adjacent its upper end is a threaded stud 47 on which a cross member 49 is pivotally carried. As will become apparent shortly, the cross member 49 is caused to pivot about the stud in response to a tension on the fishing line and in so pivoting actuates the signal system of the device. Means are provided for selectively regulating the freedom of pivotal movement of the cross member so as to permit the sensitivity of the signal system to be regulated for various anticipated conditions.

In the illustrated embodiment, freedom of movement of the cross member is regulated by a spring washer 51 which is carried adjacent the outer end of the stud and urged in the direction of the cross member by a wing nut 53. The spring washer creates a frictional drag on the cross member which maintains it in a relatively fixed position under normal circumstances, but which permits it to pivot about the stud in response to a force of suitable magnitude. An adapter 55 having a concave groove 57 in one face and a flat surface 59 defining its opposite face is disposed adjacent each of the forward and rearward sides of the cross member in surrounding relation to the stud 47 to provide the cross member with a suitable flat surface engageable by the spring washer 51 on one side and with a bearing plate 61 disposed intermediate the cross member and the standard on the other side.

In order that the cross member will be caused to pivot in response to a suitable tension on the line 25, the line extends from the reel 23 to and through a guide means 63 located at one end of the cross member 49. A downward force on the line, resisted by the frictional drag of the reel 23, produces a tension in the line sufficient to cause downward movement of the guide means and, hence, pivotal movement of the cross member. The guide means 63 comprises, in the illustrated embodiment, a hook 65 which is preferably open to permit the line to be easily threaded therethrough.

It may be found in the use of the device that greater selectivity is desired than that provided by the use of a friction means such as the spring washer 51 previously described, such a situation arising for example where the anticipated catch comprises only small fish, or where it is desired to appraise the fisherman of any slight movement of the line evidencing a nibbling of the bait by a fish. To accommodate such a situation, a weight 69 is slidably disposed on the fishing line intermediate the reel and guide means, and the wing nut 53 on the stud which mounts the cross arm is preferably loosened until the spring washer barely engages the cross arm. By choosing a weight of proper magnitude, the cross member can be delicately balanced such that a very slight tension on the line will cause the cross member to pivot and cause the signal system of the device, soon to be described, to be actuated.

The weight 69 is shown for purposes of illustration as including a base portion 71 and a hook 73 extending upwardly from the base. The hook 73 is preferably open along one edge so that the weight may be easily hung on or removed from the line, thereby permitting the weights to be interchanged as desired. It is of course understood that the spring washer 53 need not be completely disengaged when the weight is used and that a combination of the washer and a weight of given magnitude may be utilized in balancing the cross member.

The signal system of the device which appraises the fisherman of the fact that a fish has been hooked comprises in the illustrated embodiment a contact 75 fixed to the standard 13 and electrically connected both to a set of four dry cell batteries 77 carried by the standard 13 and to a light bulb 79 mounted on the end of the cross member 49 opposite to the guide means 63. A second contact 81 mounted on the cross member 49 is also electrically connected to the light bulb 79 and is so positioned that when the cross member pivots in response to a tension on the line, the contacts 75 and 81 will be caused to engage one another and complete a circuit between the batteries 77 and the light bulb, thereby causing the bulb to light and appraising the fisherman of the fact that a fish has been caught.

More specifically, secured to the standard 13 and projecting laterally therefrom intermediate the reel 23 and cross member 49 is an arm 83 which carries adjacent its outer end a box-like container 85 within which the set of dry cell batteries 77 are carried. The batteries are connected in series with one another by a contact plate 87. The container 85 is preferably provided with a hinged lid so that batteries may be easily changed when they become weak.

The first contact 75 is mounted on the top wall of the container 85 and extends through the wall and into engagement with the positive pole of one of the batteries, while a terminal bolt 89, provided with a cap nut 91, projects outwardly from a side wall of the container and is electrically connected to the negative terminal of the other of the batteries. The terminal bolt 89 is connected by a conductor 93 to a mounting plate 97 for the light bulb 79, hereinafter described.

The light assembly is located adjacent that end of the cross member which is opposite to that provided with the guide means 63 and is carried within a tubular extension 95 projecting axially of the cross member. The mounting plate 97 comprising a circular conductive disk is carried within the tubular extension and is provided with a central opening within which a bulb socket 99 is mounted. A bi-metallic filament which contracts slightly when heated is disposed intermediate the bulb 79 and the contact of the socket 99 to cause the bulb 79 to flash on and off rather than remain lighted after the circuit has been closed so as to more readily attract the attention of the fisherman and also cause the bulb to draw less current. The side wall of the tubular extension is provided with a slot 101 through which the conductor 93 passes. The conductor 93 is secured as by soldering to the conductive disk 97. A second conductor 103 also extends through the slot 101 and interconnects the bulb socket with the second contact 81, soon to be described.

In order to protect the bulb 79 from breakage or other damage a cover 105 is secured to the outer end of the tubular extension 95 by means of male and female threads provided on the extension and cover respectively. If desired, covers of various colors may be provided so that the color of the light emitted by the bulb may be varied. In this manner, devices belonging to several fishermen operating in the same vicinity may be distinguished from one another.

The second contact 81 is mounted by means of a band 107 on the cross member 49 intermediate the point of pivotal connection of the cross member and that end of cross member which is provided with the guide means 63. The second contact is electrically connected to the bulb socket 99 by the second conductor 103 and is positioned such that when the cross member pivots in response to a tug or tension on the line, the second contact engages the first contact 75 and completes a circuit between the batteries and bulb. Engagement of the contacts also limits the pivotal movement of the cross member, as can be seen by the broken line representation of FIGURE 1.

It should be noted that once the circuit between the bulb and battery has been closed, it will have a tendency to remain closed since the cross member will have a tendency to remain in the inclined position. Accordingly, with the present device, there is little or no possibility of the fishermen not being appraised of the fact that a fish has been hooked. Also, it should be noted that the device can be made sufficiently sensitive so that if a fish should tug the line only slightly, as when stealing the bait, the signal system will still be actuated and the fisherman will be appraised of this fact.

A device has thus been shown and described which is particularly adapted for ice fishing, which provides an effective signaling system to appraise the fishermen of the fact that a fish has been caught, and which is essentially fool proof in that the signal system provided will be actuated even when the bait has been taken but no fish has been caught. The device includes means for selectively regulating the degree and sensitivity with which it operates, and may thereby be adjusted to respond to the striking or feeding habits of various types of fish. The device also includes a safety means for insuring that all of the line will not be played out when a fish strikes.

While various features of the invention have been shown and described with reference to one specific embodiment thereof, it should be apparent that various structural modifications may be made therein without departing from the scope of the invention as set forth in the following claim.

What is claimed is:

An ice fishing device adapted to be supported on the surface of the ice adjacent a hole therein and to suspend a length of partially submerged fishing line in vertical disposition extending through the hole, said device comprising an elongated standard having a pointed lower end adapted to be driven vertically beneath the surface of the ice so as to maintain said standard in an upright position above said surface, a reel rotatably carried on said standard intermediate the ends thereof for supporting a quantity of fishing line, means frictionally engaging said reel so as to restrain rotation thereof, handle means projecting from a wall of said reel for effecting manual rotation thereof, a cross member mounted intermediate its ends adjacent the upper end of said standard for pivotal movement about a horizontal axis, means for selectively regulating the freedom of pivotal movement of said cross member, guide means at one end of said cross member having an aperture therein, a fishing line wrapped about said reel and having a portion extending from said reel through said aperture of said guide means and downwardly in suspended relation therefrom, increase of tension of said line being effective to exert a downward force on said one end of said cross member and to cause pivotal movement thereof in a given direction, weight means suspended from said fishing line and slidable thereon intermediate said reel and said guide means, and a signal system adapted to be actuated incident to pivotal movement of said cross member in said given direction, said signal system comprising an arm projecting laterally from said standard, a first contact carried by said arm, battery means carried by said arm and electrically connected to said first contact, a second contact carried by said cross member and positioned so as to engage said first contact upon pivotal movement of said cross member in said given direction to a predetermined position, engagement of said contacts being effective to limit pivotal movement of said cross member, an electric light bulb carried by said cross member, translucent covering means adapted to be placed in surrounding relation to said bulb and adapted to influence the color of light emitted thereby, and means electrically connecting said light bulb with each of said contacts whereby movement of said cross member to said predetermined position wherein said contacts engage one another completes an electrical circuit between said light bulb and said battery means.

References Cited in the file of this patent
UNITED STATES PATENTS

| | | |
|---|---|---|
| 1,451,124 | Stolze | Apr. 10, 1923 |
| 2,136,864 | Paquette | Nov. 15, 1938 |
| 2,592,967 | Snapps | Apr. 15, 1952 |
| 2,663,962 | King | Dec. 29, 1953 |
| 2,714,270 | Premo | Aug. 2, 1955 |
| 2,741,054 | Brundage | Apr. 10, 1956 |
| 2,816,388 | Hartley | Dec. 17, 1957 |